United States Patent
Aljoe et al.

(10) Patent No.: US 10,745,210 B2
(45) Date of Patent: Aug. 18, 2020

(54) SORTING MACHINE WITH DYNAMIC LANE ROUTING

(71) Applicant: Walmart Apollo, LLC, Bentonville, AR (US)

(72) Inventors: Brynn C. Aljoe, Bentonville, AR (US); Bo Dillon, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 124 days.

(21) Appl. No.: 15/917,246

(22) Filed: Mar. 9, 2018

(65) Prior Publication Data
US 2018/0257873 A1 Sep. 13, 2018

Related U.S. Application Data

(60) Provisional application No. 62/470,018, filed on Mar. 10, 2017.

(51) Int. Cl.
| | | |
|---|---|---|
| *B65G 47/49* | (2006.01) | |
| *G06Q 10/08* | (2012.01) | |
| *B07C 3/18* | (2006.01) | |
| *B07C 5/36* | (2006.01) | |
| *B07C 3/02* | (2006.01) | |

(52) U.S. Cl.
CPC .............. *B65G 47/49* (2013.01); *B07C 3/02* (2013.01); *B07C 3/18* (2013.01); *B07C 5/36* (2013.01); *G06Q 10/08* (2013.01); *B07C 2301/0016* (2013.01)

(58) Field of Classification Search
CPC .... B07C 3/02; B07C 3/18; B07C 5/36; B07C 2301/0016; B65G 47/49; G06Q 10/08
See application file for complete search history.

(56) References Cited

U.S. PATENT DOCUMENTS

| | | | |
|---|---|---|---|
| 3,785,510 A | | 1/1974 | Grooteboer |
| 7,121,398 B2 * | | 10/2006 | Affaticati .................. B07C 5/36 198/357 |
| 7,671,293 B2 | | 3/2010 | Fry et al. |
| 8,504,192 B2 | | 8/2013 | Faivre et al. |
| 8,731,708 B2 | | 5/2014 | Shakes et al. |
| 8,815,031 B2 | | 8/2014 | Olsen et al. |
| 2014/0291112 A1 | | 10/2014 | Lyon et al. |
| 2014/0364998 A1 * | | 12/2014 | Neiser ................... B65G 43/08 700/230 |
| 2016/0339480 A1 | | 11/2016 | Tresse et al. |

FOREIGN PATENT DOCUMENTS

JP 2008156128 A 7/2008

* cited by examiner

*Primary Examiner* — Charles A Fox
*Assistant Examiner* — Kalyanavenkateshware Kumar
(74) *Attorney, Agent, or Firm* — Venable LLP; Jeffri A. Kaminski

(57) ABSTRACT

A sorter including a conveying system to transport items to be sorted. A plurality of lanes are configured to accept the items from the conveying system. A scanner reads information about the items to be sorted. The information including a destination for the item. A controller is in communication with the scanner to receive the destination for the items being sorted and is adapted to open and close selected ones of the plurality of lanes to receive items.

16 Claims, 4 Drawing Sheets

SORTING MACHINE WITH DYNAMIC LANE ROUTING

BACKGROUND

1. Technical Field

The present disclosure relates to a sorting machine and related methods for dynamically routing items for processing and transport.

2. Introduction

In the drive to increase the efficiency and profitability of retail operations, improving the management of warehouse and inventory activities is often overlooked. Trailers containing cases of items may continually arrive at a warehouse or distribution center. These cases of items may be bound for the same or different end destinations and arrive at the same time, on different trailers. Those cases bound for the same destination should be consolidated so they may be shipped at the same time, saving on transportation costs. Sorting machines at the warehouse process the cases of items and may require a large footprint of the facility. In addition, these sorting machines may not run at optimal capacity. For example a single case bound for a destination may recirculate on the sorting machine for an extended period of time waiting for other cases bound for the same destination to arrive, while numerous cases are recirculated waiting for an open lane, thus clogging the sorting machine and decreasing throughput.

In large retail operation, warehouse processing may account for a large portion of the time and costs of customer order fulfillment. Clearly, simplifying and streamlining the process and maximizing the capacity of the sorting machine could yield significant improvements to the operational expense of any retail operation.

SUMMARY

Embodiments of the invention provide a sorter comprising a conveying system to transport items to be sorted. A plurality of lanes accepts the items from the conveying system. A scanner reads information about the items to be sorted, the information including a destination for the item. A controller is in communication with the scanner to receive the destination for the items being sorted, and further adapted to open and close selected ones of the plurality of lanes, where the controller is configured to: determine which of the plurality of lanes are available to receive items in order to identify non-full lanes; identify any non-full lane that may be assigned to the destination for the item being sorted as a potential lane for the item; identify as an assigned lane at least one potential lane that is currently assigned to the destination corresponding to the destination of item being sorted; determine that the at assigned lane cannot receive additional items corresponding to the destination; identify any of the potential lanes that are not currently assigned to a destination; assign the identified potential lane to the destination for the item being sorted; control the conveying system to transport items with a destination corresponding to the destination to that lane.

A method for transporting items in a sorting facility is also provided. The method may include: scanning information about an item to be sorted, the information including a destination for the item; conveying the item along a sorting apparatus; determining which of a plurality of lanes are available to receive items in order to identify non-full lanes; identifying any non-full lane that may be assigned to the destination for the item being sorted as a potential lane for the item; identifying as an assigned lane at least one potential lane that is currently assigned to the destination corresponding to the destination of item being sorted; determining that the at assigned lane cannot receive additional items corresponding to the destination; identifying any of the potential lanes that are not currently assigned to a destination; assigning the identified potential lane to the destination for the item being sorted; conveying items with a destination corresponding to the destination to that lane.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

The disclosed systems, methods, and computer-readable storage mediums improve the efficiency of a sorter that processes items received at a facility while reducing the footprint of the sorter. Consider the example of a distribution center that receives items that are to be processed and transported to retail stores or other locations. Items may arrive in many different trailers and be bound for different destinations. The items are sorted so that items bound for the same destination are grouped together, then palletized and transported to that destination. The sorter may have a number of lanes that may be assigned to receive items bound for a particular destination. As the item is processed, the sorter may dynamically open and close lanes as demand increase and decreases. For example, in prior implementations, each of the sorting lanes is assigned to a destination; requiring a lane for each destination. Items are then routed to a lane corresponding to that destination. In embodiments of the invention, lanes are unassigned until items bound for a destination are processed. As items are received at the facility sorting lanes may be dynamically opened/closed to accommodate demand for that destination. All lanes may be open and assigned to a destination in times of high demand. In comparison only a subset of lanes may be open assigned a destination in times of low demand.

Capacity and efficiency of the sorter may also be improved for a sorter of a given number of lanes. All lanes that can be filled are filled with items before any recirculation of the item takes place, minimizing the recirculation of items. Additionally, this practice allows for a near infinite number of potential destinations to exist on a sorter machine with a finite number of potential diverts because any destination can be dynamically added and removed based on transport needs.

Embodiments of the invention are described in more detail below in the context of a distribution center and retail stores, but may be used in any environment.

Figure 1:
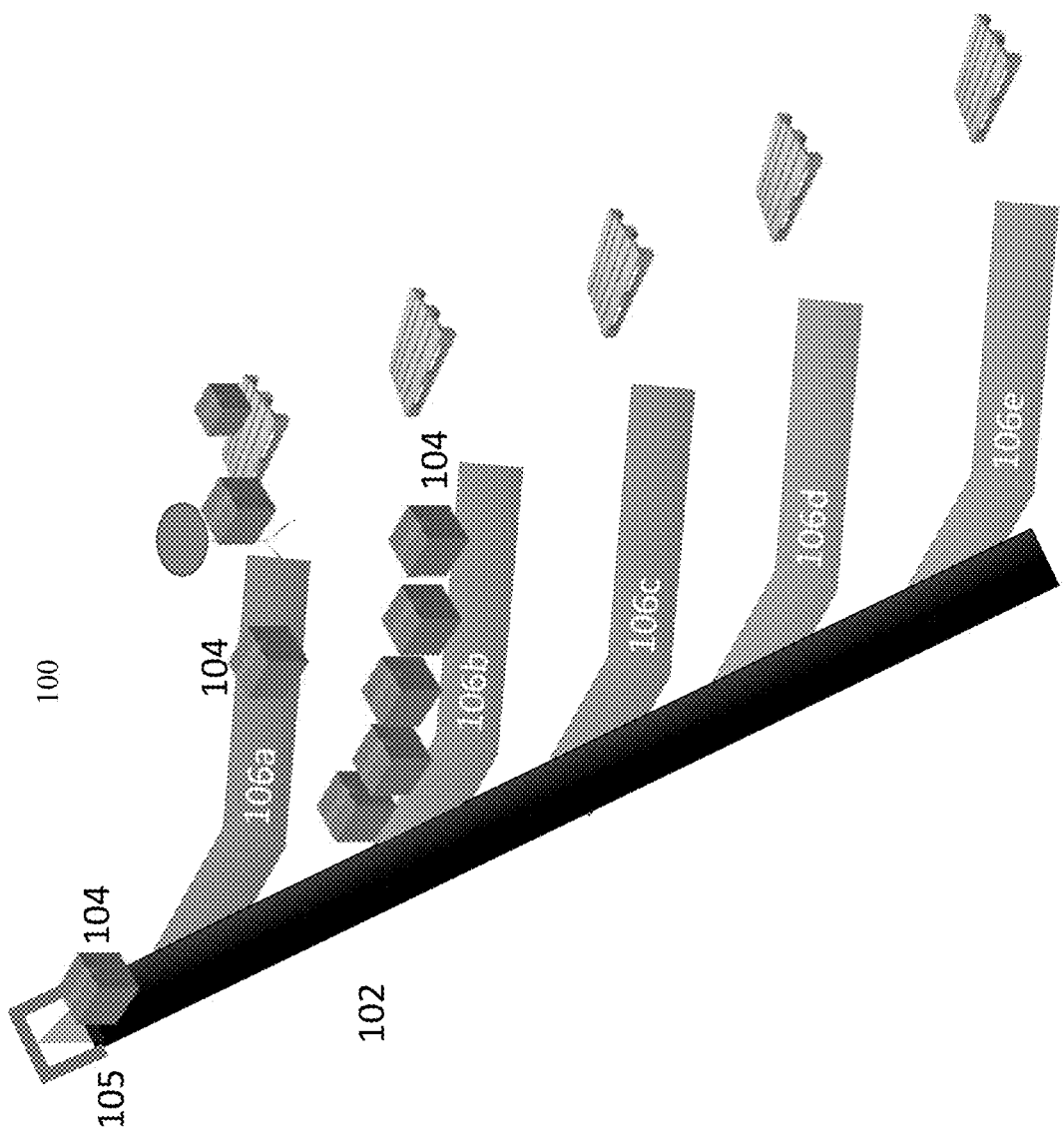
FIG. 1 illustrates an exemplary system according to an embodiment of the invention.

FIG. 1 illustrates a sorter 100 according to an exemplary embodiment of the invention. The sorter 100 may be located at a facility like a warehouse, fulfillment center, distribution center or any other location where items are sorted. The sorter 100 may include a conveying system 102 to transport items. In the example shown, the item is a case 104. Information about a case and the case contents may be provided on the case, for example in a label. The label may store information in a bar code, RFID label and the like. The information in the label may include a destination for the case, such as a retail store or individual consumer, the items in the case, and where the case shipped from. A scanner 105 may be provided to scan the label and capture the information from the label as the case 104 is processed and moves along the sorter 100. The location of the case may be tracked as it progresses through the sorting process. This may be done using RFID, scanning the label at different locations, manual data entry or other tracking methods. Scanners may also be provided at locations apart from the sorter 100, such as on a receiving dock, to track the case as it is processed. The information scanned from the label may be provided to a controller. The controller may monitor the location of the cases, control the sorting process and determine how to route the cases to the lanes.

The sorter 100 may include a number of lanes 106a-106e configured to accept cases 104 from the conveying system 102. The cases 104 are routed to the lanes 106a-106e based on the information scanned from the label, such as destination of the case. Lanes may also be assigned based on preferences. In an example, users may provide a list of lanes that it is allowed to be assigned. Each lane within that group may be ranked from top to bottom to determine which may be the first lane selected when a new lane needs to be opened. A group can only be assigned to a lane may be assigned if that lane is listed in the preference list. Other information scanned from the label or provided from other sources may also be used to determine the routing of the case 104. In the example shown, five lanes 106a-106e are provided, but sorters may have a different number of lanes. The number of lanes may impact the footprint of the sorter 100 in the facility, as well as the processing capacity.

Embodiments of the invention can maximize the capacity for a sorter with a given number of lanes and keep the footprint to a minimum. All or a subset of the lanes 106a-106e may be assigned to receive case 104s at any given time. That is, if a lane is not currently needed to receive case 104s for any destination, that lane is unassigned and cases are not routed to that lane. Lanes can be opened and closed based on the supply of case 104s and their destination. Some lanes may not be assigned to a destination for a period of time and multiple lanes may be assigned to the same destination in times of high demand. The controller monitors the location of the case 104s on each lane, as well as the case 104s waiting to be routed and in route. The controller can dynamically open and close lanes to receive case 104s, unlike prior systems where all lanes are assigned to a destination. For example, if a lane does not have any case 104s on it, the lane is unassigned and available for assignment. The cases are routed to the lane(s) assigned to that destination, for example as described below, palletized, and transported to their destination.

Figure 2:
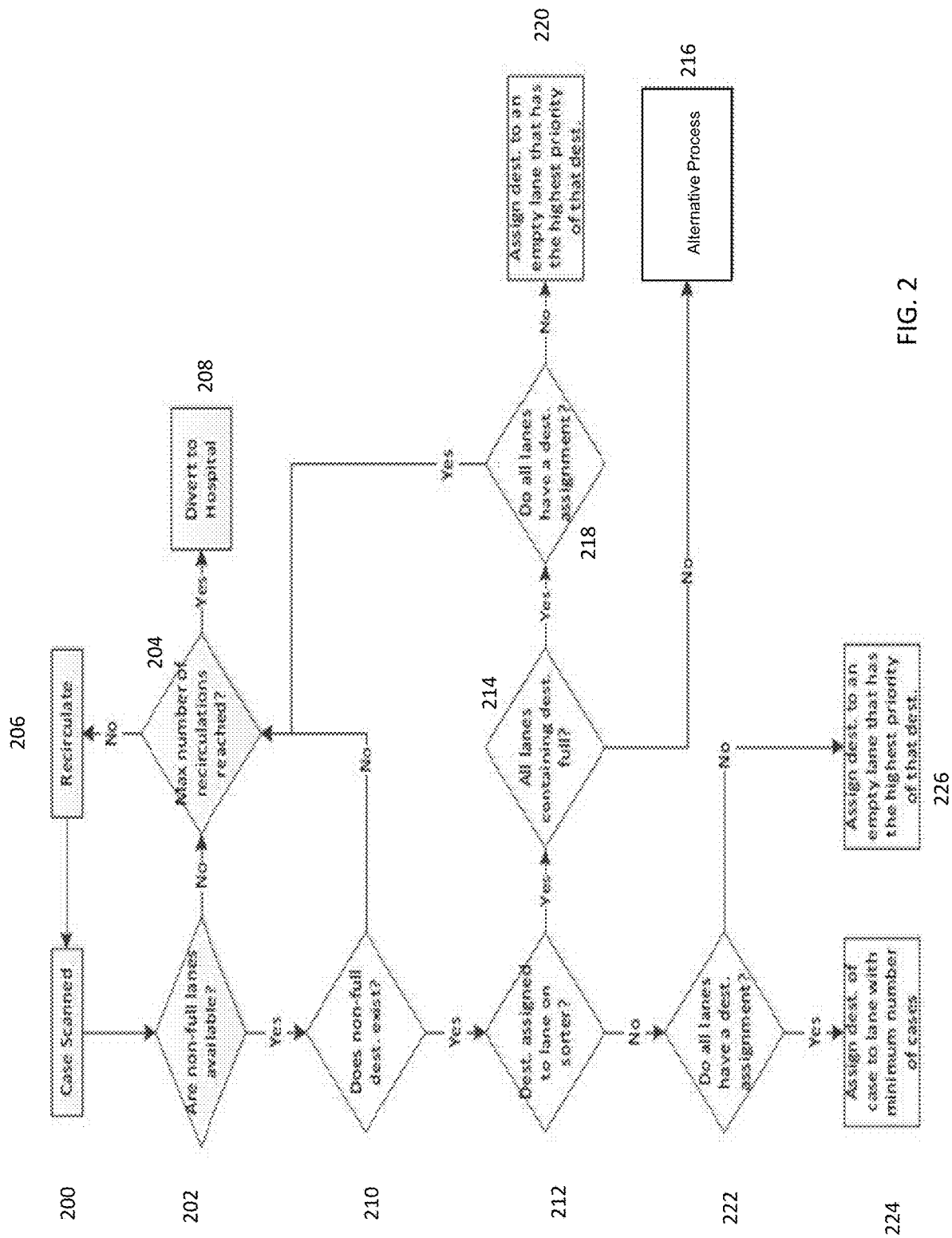
FIG. 2 illustrates an exemplary method according to an embodiment of the invention.

FIG. 2 illustrates a method according to an exemplary embodiment of the invention that may be performed using the system of FIG. 1. The process may start at step 200 when the label on the case is scanned. Scanning may create a unique identifier for the case 104 and capture information about the case, for example, the particular type of case and its destination. The scanning may alert the controller that a case is present to be routed. It is determined if there is a lane available to receive the case, step 202. For example a lane may be entirely filled with cases, as is shown for lane 106b in FIG. 1, and not able to mechanically accept the case. If all of the lanes 106a-106e are full, then there is nowhere to route the case. The case is diverted to a recirculation process.

In the recirculation process, the case is not routed to a lane and is recirculated through the sorter 100. It is determined if the case has gone through the recirculation process previously and if a maximum number of recirculation has been reached, steps 204, 206. This may be done using a counter for the case and comparing the counter to a predetermined maximum. If the maximum has been reached, there is likely an issue with the item such as the label is illegible or damaged. The case is diverted to a "hospital" for investigation so as to not to continue recirculating the case, step 208.

If there are one or more lanes mechanically able to receive the case, it is determined if any of those lanes can be assigned to the destination for that particular case, step 210. In the example shown in FIG. 1, there are five lanes 106a-106e. A subset of these lanes, lanes 106a-c, may have the potential to be assigned to receive items bound for that case's destination. A check is made if any of those potential lanes 106a-c is mechanically able to receive the case, that is, if any one of lanes 106a-c is not full. If there is no potential lane that is able to receive the case, the case is recirculated, step 204.

In another embodiment, the case may be assigned to the full lane with the potential to be assigned to that case that has the longest time since a recirculation. If that lane opens before the case passes along on the conveyor, the case is routed to that lane. For example, the case is assigned to a full lane with the assignment that has the oldest timestamp for the last recirculation. If lane opens before case passes, the case is routed down the lane. Lanes 1, 2, are 3 are assigned to receive the case, but all are full. Lane 1 was last diverted to at 9:42:01, Lane 2 was last diverted to at 9:42:05, and Lane 3 was last diverted to at 9:42:15. Thus, the case is assigned to Lane 1.

When there are potential lanes available, the process moves to step 212. Here it is determined if any of the potential lanes are currently assigned to the destination for the current case. If one or more of the lanes is currently assigned to the destination, the process determines if any of those assigned lanes is full, that is, is that lane mechanically able receive the case, step 214. If a lane is currently assigned to the case's destination and is able to receive the case 104, the case 104 is routed to that lane, step 216.

When all lanes currently assigned to the case's destination are full, those lanes that are not currently assigned to a destination are identified, step 218. If all lanes are assigned, the case goes through the recirculation process and moves to step 204.

If there are unassigned lanes, an unassigned lane is opened and assigned to the case's destination, step 220. There may be a priority for which of the available lanes is opened and assigned to a destination. The priority may be determined based on pre-set criteria. For example, a lane that is adjacent or closer to one of the lanes that is currently assigned to the destination may have a higher priority that another, unassigned lane farther away. In this manner, the sorter can route cases with destinations that have higher demand in a dynamic fashion. An unassigned lane can be assigned to a destination that is experiencing a surge in demand. This allows the sorter and the lanes to have a smaller footprint than prior systems, where each potential destination is statically assigned a lane, even if the lane is not currently in use processing cases for that destination.

Returning to step 212, there may be situations when the destination for the case is not currently assigned to a lane. For example, if this is the first time a destination is encountered that day or other time period, there will not be a lane currently assigned to that case's destination. In such a scenario, it is determined whether to open a new lane for that destination or to route the case to a currently open lane assigned to another destination. This determination may depend on the current capacity of the sorter. In an exemplary embodiment capacity should be increased, for example by opening a new lane.

Those lanes that are not assigned to a destination are identified, step 222. If all lanes are assigned to a destination, the case is routed to an already assigned lane, step 224. This lane may be selected based on predetermined criteria, such as that lane with the minimum number of cases on it. For example, each of the five lanes 106a-106e may be examined. The controller may override the current lane assignment and send the current case to the lane with the smallest number of cases. A worker (manual or automatic) may complete the current pallet and start a new pallet for the new destination. The worker may receive information that this is a new case, for example via a user interface, when completing palletizing process.

If there are unassigned lanes, the destination is assigned to the lane that has the highest priority, step 226. The priority may be determined in the same manner as in connection with step 220.

In some embodiments, a lane may be assigned to fill a pallet with items all having the same SKU. Items having that SKU may be routed or recirculated until there is room on that lane to accept the item. In this case, additional lanes may not be opened for the item.

Figure 3:
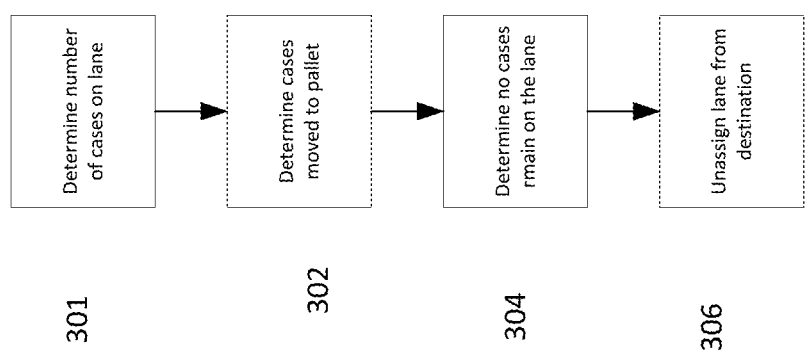
FIG. 3 illustrates an exemplary method according to an embodiment of the invention.

FIG. 3 illustrates an exemplary process that may be used in connection with closing a lane. Lanes may be closed when there are no cases on a lane or the volume of cases for a destination decreases. In an exemplary embodiment, three lanes 106a-106c may be assigned to a destination. Three cases for that destination may be being processed by the sorter. Instead of sending one case to each of the three lanes 106a-106c, the volume of cases is consolidated onto one lane 106a. The other two lanes 106b-106c may closed and available for reassignment. The controller may monitor how many cases are present on a lane as described above, step 301. As the cases are removed from the lane and palletized, the labels are scanned and the location is updated to indicate that the cases are on the pallet and no longer on the lane, step 302-304. The lane will be unassigned from that destination, allowing the lane to be available for assignment to a different destination, step 306. For example, when the number of cases on a lane is low or when there are no cases on the lane, the lane may be "closed," that is, no longer assigned to any destination. This may be done as soon as there are no cases on the lane or when there are no cases on the lane for a predetermined period of time.

Figure 4:
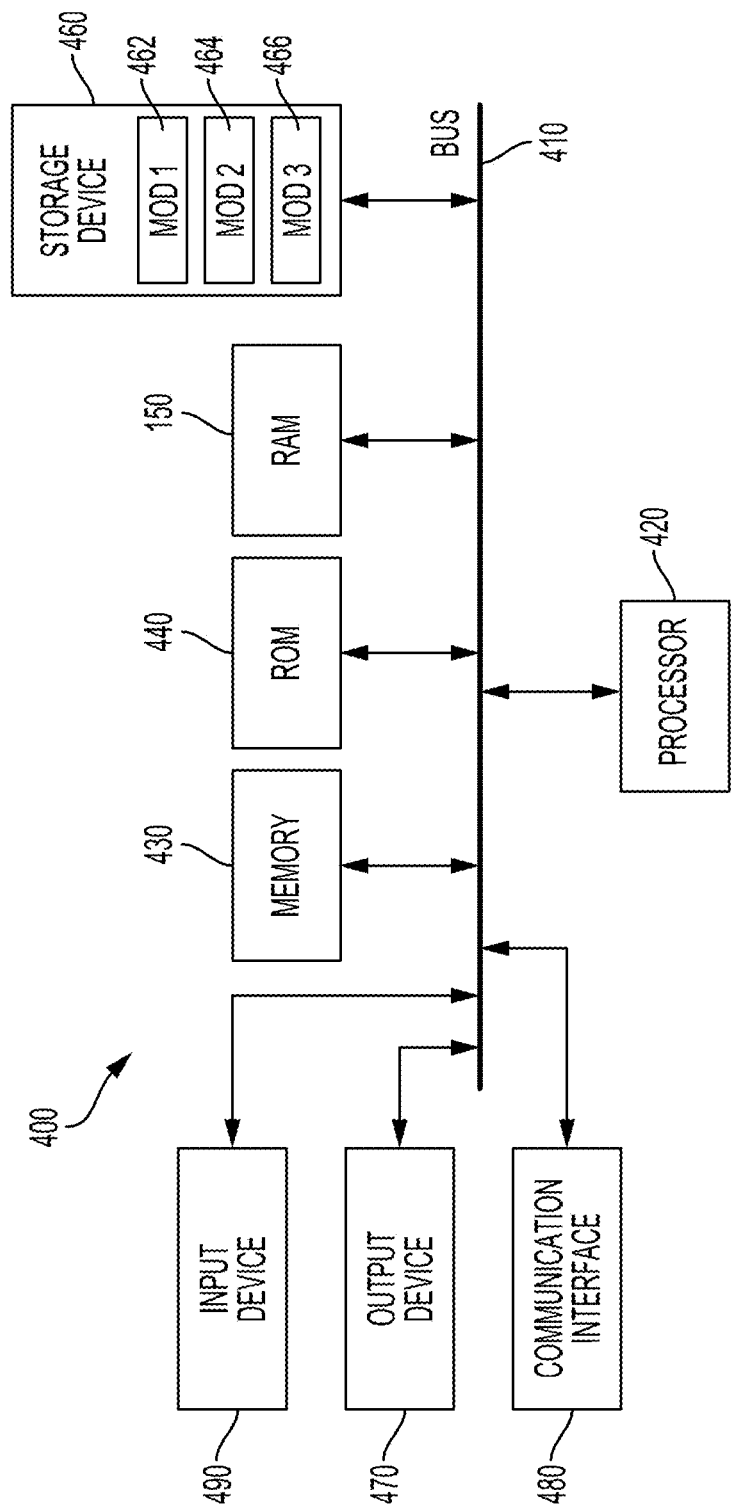
FIG. 4 illustrates an example computing system.

With reference FIG. 4, which illustrates an exemplary system 400 used in performing the method, includes a general-purpose computing device 400, including a processing unit (CPU or processor) 420 and a system bus 410 that couples various system components including the system memory 430 such as read only memory (ROM) 440 and random access memory (RAM) 450 to the processor 420. The system 400 can include a cache 422 of high speed memory connected directly with, in close proximity to, or integrated as part of the processor 420. The system 400 copies data from the memory 430 and/or the storage device 460 to the cache 422 for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as Mod1 462, Mod2 464, and Mod3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive, or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se. To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A sorter, comprising:
   a conveying system to transport items to be sorted;
   a plurality of lanes configured to accept the items from the conveying system;
   a scanner to read information about the items to be sorted, the information including a shipping destination for the item;
   a controller in communication with the scanner to receive the shipping destination for the items being sorted, and further adapted to open and close selected ones of the plurality of lanes, where the controller is configured to:
   determine which of the plurality of lanes are available to receive items in order to identify non-full lanes;
   identify any non-full lane that may be assigned to the shipping destination for the item being sorted as a potential lane for the item;
   identify as an assigned lane at least one potential lane that is currently assigned to the shipping destination corresponding to the shipping destination of item being sorted;
   determine that the assigned lane cannot receive additional items corresponding to the shipping destination;
   identify any of the potential lanes that are not currently assigned to a shipping destination;
   assign the identified potential lane to the shipping destination for the item being sorted;
   control the conveying system to transport items with a shipping destination corresponding to the shipping destination to that lane;
   determine that at least one of the plurality of lanes does not have any items; and
   remove the assignment of that lane to allow the lane to be reassigned a different shipping destination.

2. The sorter of claim 1, wherein the controller is further configured to:
   determine that none of the potential lanes is currently assigned to the shipping destination for the item being sorted;
   determine that all of the plurality of lanes have an assigned shipping destination; and
   assign the shipping destination corresponding to the item being sorted to the lane with the minimum number of items on it.

3. The sorter of claim 1, wherein the controller is further configured to:
   determine that none of the potential lanes is currently assigned to the shipping destination for the item being sorted;
   determine that at least one of the plurality of lanes does not have an assigned shipping destination; and
   assign the shipping destination of the item to the unassigned lane with a highest priority corresponding to that shipping destination.

4. The sorter of claim 3, wherein the priority is determined based on a distance between the lanes or other factors that make the new location for the shipping destination optimal, based on a user's entered settings.

5. The sorter of claim 1, wherein the controller is further configured to:
   determine that all of the plurality of lanes is full; and
   recirculating the item through the sorter.

6. The sorter of claim 1, wherein the information includes a type of item.

7. The sorter of claim 1, wherein the item is a case and the information includes contents of the case.

8. The sorter of claim 1, wherein the controller is further configured to:
   determine that there have been no cases on the lane for a predetermined period of time; and
   close the lane once the predetermined period of time has elapsed.

9. The sorter of claim 1, wherein a label including the information is provided on the item.

10. The sorter of claim 9, wherein the label is one of a bar code or RFID label.

11. The sorter of claim 1, further comprising a plurality of scanners arranged along the conveying system and lanes.

12. A sorter, comprising:
    a conveying system to transport items to be sorted;
    a plurality of lanes configured to accept the items from the conveying system;
    a scanner to read information about the items to be sorted, the information including a shipping destination for the item;
    a controller in communication with the scanner to receive the shipping destination for the items being sorted, and further adapted to open and close selected ones of the plurality of lanes, where the controller is configured to:
    determine which of the plurality of lanes are available to receive items in order to identify non-full lanes;
    identify any non-full lane that may be assigned to the shipping destination for the item being sorted as a potential lane for the item;
    identify as an assigned lane at least one potential lane that is currently assigned to the shipping destination corresponding to the shipping destination of item being sorted;
    determine that the assigned lane cannot receive additional items corresponding to the shipping destination;
    identify any of the potential lanes that are not currently assigned to a shipping destination;

assign the identified potential lane to the shipping destination for the item being sorted;
determine that none of the potential lanes is currently assigned to the shipping destination for the item being sorted;
determine that all of the plurality of lanes have an assigned shipping destination; and
assign the shipping destination corresponding to the item being sorted to the lane with the minimum number of items on it;
determine that none of the potential lanes is currently assigned to the shipping destination for the item being sorted;
determine that at least one of the plurality of lanes does not have an assigned shipping destination;
assign the shipping destination of the item to the unassigned lane with a highest priority corresponding to that shipping destination;
control the conveying system to transport items with a shipping destination corresponding to the shipping destination to that lane;
determine that at least one of the plurality of lanes does not have any items; and
remove the assignment of that lane to allow the lane to be reassigned a different shipping destination.

13. A method for transporting items in a sorting facility, comprising:
scanning information about an item to be sorted, the information including a shipping destination for the item;
conveying the item along a sorting apparatus;
determining which of a plurality of lanes are available to receive items in order to identify non-full lanes;
identifying any non-full lane that may be assigned to the shipping destination for the item being sorted as a potential lane for the item;
identifying as an assigned lane at least one potential lane that is currently assigned to the shipping destination corresponding to the shipping destination of item being sorted;
determining that the at assigned lane cannot receive additional items corresponding to the shipping destination;
identifying any of the potential lanes that are not currently assigned to a shipping destination;
assigning the identified potential lane to the shipping destination for the item being sorted;
conveying items with a shipping destination corresponding to the shipping destination to that lane;
determining that at least one of the plurality of lanes does not have any items; and
removing the assignment of that lane to allow the lane to be reassigned a different shipping destination.

14. The method of claim 13, further comprising:
determining that none of the potential lanes is currently assigned to the shipping destination for the item being sorted;
determining that all of the plurality of lanes have an assigned shipping destination; and
assigning the shipping destination corresponding to the item being sorted to the lane with the minimum number of items on it.

15. The method of claim 13, further comprising:
determining that none of the potential lanes is currently assigned to the shipping destination for the item being sorted;
determining that at least one of the plurality of lanes does not have an assigned shipping destination; and
assigning the shipping destination of the item to the unassigned lane with a highest priority corresponding to that shipping destination.

16. The method of claim 13, further comprising:
determining that all of the plurality of lanes is full; and
recirculating the item through the sorter.

* * * * *